(12) United States Patent
Skelton et al.

(10) Patent No.: US 9,305,429 B2
(45) Date of Patent: Apr. 5, 2016

(54) WAGERING SYSTEM AND METHOD

(71) Applicant: Sportech Racing, LLC, Alpharetta, GA (US)

(72) Inventors: Louis Felipe Skelton, Cumming, GA (US); Scott Andrew Watterson, Cumming, GA (US)

(73) Assignee: Sportech Racing, LLC, Alpharetta, GA (US)

( * ) Notice: Subject to any disclaimer, the term of this patent is extended or adjusted under 35 U.S.C. 154(b) by 0 days.

(21) Appl. No.: 14/515,064

(22) Filed: Oct. 15, 2014

(65) Prior Publication Data

US 2016/0027256 A1 Jan. 28, 2016

Related U.S. Application Data

(63) Continuation-in-part of application No. 14/193,996, filed on Feb. 28, 2014, now Pat. No. 9,047,638, which is a continuation of application No. 13/796,976, filed on Mar. 12, 2013, now Pat. No. 8,708,807.

(60) Provisional application No. 61/636,976, filed on Apr. 23, 2012.

(51) Int. Cl.
*A63F 13/12* (2006.01)
*G07F 17/32* (2006.01)

(52) U.S. Cl.
CPC .................... *G07F 17/3251* (2013.01)

(58) Field of Classification Search
USPC .................................................. 463/25, 29
See application file for complete search history.

(56) References Cited

U.S. PATENT DOCUMENTS

| 4,764,666 | A | 8/1988 | Bergeron |
| 4,882,473 | A | 11/1989 | Bergeron et al. |
| 5,215,576 | A | 6/1993 | Carrick |
| 5,417,424 | A | 5/1995 | Snowden et al. |
| 5,569,082 | A | 10/1996 | Kaye |
| 5,709,603 | A | 1/1998 | Kaye |
| D395,458 | S | 6/1998 | Smith et al. |
| 5,797,794 | A | 8/1998 | Angell |
| 5,816,919 | A | 10/1998 | Scagnelli et al. |
| 5,904,619 | A | 5/1999 | Scagnelli et al. |
| 5,910,047 | A | 6/1999 | Scagnelli et al. |
| D412,018 | S | 7/1999 | Hoopes |
| 5,921,865 | A | 7/1999 | Scagnelli et al. |
| 5,935,000 | A | 8/1999 | Sanchez, III et al. |
| 6,000,725 | A | 12/1999 | Nicolosi et al. |
| 6,178,510 | B1 | 1/2001 | O'Connor et al. |

(Continued)

FOREIGN PATENT DOCUMENTS

| EP | 2336989 A1 | 6/2011 |
| EP | 2528029 A1 | 11/2012 |
| KR | 10-0694247 B1 | 3/2007 |

OTHER PUBLICATIONS

International Search Report for Application No. PCT/US2013/030512 dated Jun. 20, 2013.

(Continued)

*Primary Examiner* — Pierre E Elisca
(74) *Attorney, Agent, or Firm* — Lerner, David, Littenberg, Krumholz & Mentlik, LLP

(57) ABSTRACT

A system is provided that, in some aspects, determines a user's intent to place a wager or redeem a wager based on bar codes generated by a client device operated by the user.

19 Claims, 8 Drawing Sheets

(56) References Cited

U.S. PATENT DOCUMENTS

| | | |
|---|---|---|
| 6,241,606 B1 | 6/2001 | Riendeau et al. |
| 6,368,218 B2 | 4/2002 | Angell, Jr. |
| 6,368,219 B1 | 4/2002 | Szrek et al. |
| 6,477,251 B1 | 11/2002 | Szrek et al. |
| 6,514,144 B2 | 2/2003 | Riendeau et al. |
| 6,702,672 B1 | 3/2004 | Angell et al. |
| 6,726,077 B2 | 4/2004 | Roberts et al. |
| 6,761,633 B2 | 7/2004 | Riendeau et al. |
| D500,616 S | 1/2005 | Wagoner et al. |
| D501,227 S | 1/2005 | Boothe et al. |
| D503,744 S | 4/2005 | Mirkovic et al. |
| 6,918,589 B2 | 7/2005 | Thibault |
| 6,932,258 B1 | 8/2005 | Roberts et al. |
| 7,008,317 B2 | 3/2006 | Cote et al. |
| 7,032,793 B2 | 4/2006 | Roberts et al. |
| 7,128,319 B2 | 10/2006 | Finocchio |
| 7,311,599 B2 | 12/2007 | Knapp |
| 7,381,132 B2 | 6/2008 | Roberts |
| 7,540,413 B2 | 6/2009 | Meehan et al. |
| 7,548,797 B2 | 6/2009 | Perin, Jr. et al. |
| 7,576,733 B2 | 8/2009 | Tremaine et al. |
| 7,590,950 B2 | 9/2009 | Collins et al. |
| 7,651,030 B2 | 1/2010 | Collins et al. |
| 7,771,278 B1 | 8/2010 | Muskin |
| 7,920,299 B2 | 4/2011 | Abraitis et al. |
| 7,922,178 B2 | 4/2011 | Finocchio |
| 7,927,211 B2 | 4/2011 | Rowe et al. |
| 8,202,164 B2 | 6/2012 | Lechner et al. |
| 8,443,958 B2 | 5/2013 | Blake et al. |
| 8,892,469 B2 * | 11/2014 | Goldstein et al. ............... 705/50 |
| 2005/0009600 A1 | 1/2005 | Rowe et al. |
| 2006/0035704 A1 | 2/2006 | Rush et al. |
| 2007/0105617 A1 | 5/2007 | Walker et al. |
| 2007/0179883 A1 | 8/2007 | Questembert |
| 2007/0213124 A1 * | 9/2007 | Walker et al. .................... 463/25 |
| 2008/0108424 A1 * | 5/2008 | Baerlocher et al. ............. 463/25 |
| 2008/0108429 A1 * | 5/2008 | Davis et al. ..................... 463/26 |
| 2008/0188308 A1 | 8/2008 | Shepherd et al. |
| 2009/0131146 A1 | 5/2009 | Arezina et al. |
| 2009/0143128 A1 | 6/2009 | Cautley et al. |
| 2009/0203448 A1 | 8/2009 | Lupo et al. |
| 2009/0247256 A1 | 10/2009 | Barnes, II et al. |
| 2009/0247259 A1 | 10/2009 | Napolitano |
| 2009/0270166 A1 | 10/2009 | Thukral et al. |
| 2010/0093421 A1 | 4/2010 | Nyman et al. |
| 2010/0113124 A1 | 5/2010 | Amirsadri et al. |
| 2010/0121896 A1 | 5/2010 | Oram |
| 2010/0144427 A1 | 6/2010 | Bougie et al. |
| 2010/0151930 A1 | 6/2010 | Oram |
| 2010/0160022 A1 | 6/2010 | Oram |
| 2010/0160034 A1 | 6/2010 | Thibault et al. |
| 2010/0190545 A1 | 7/2010 | Lauzon et al. |
| 2010/0216543 A1 | 8/2010 | Nulph |
| 2010/0250385 A1 | 9/2010 | Lempel et al. |
| 2010/0255902 A1 * | 10/2010 | Goldstein et al. ............... 463/29 |
| 2011/0015976 A1 | 1/2011 | Lempel et al. |
| 2011/0021258 A1 | 1/2011 | Kula |
| 2011/0109040 A1 | 5/2011 | Thibault et al. |
| 2011/0121511 A1 | 5/2011 | Finnochio |
| 2011/0124407 A1 | 5/2011 | Finocchio |
| 2011/0137765 A1 | 6/2011 | Nonaka |
| 2011/0207531 A1 | 8/2011 | Gagner et al. |
| 2011/0218032 A1 * | 9/2011 | Baerlocher et al. ............. 463/25 |
| 2012/0089468 A1 | 4/2012 | Guziel |
| 2012/0244926 A1 | 9/2012 | Kolios et al. |
| 2012/0246034 A1 | 9/2012 | Kolios et al. |
| 2013/0109457 A1 | 5/2013 | Nyman et al. |
| 2013/0130778 A1 | 5/2013 | Anderson et al. |
| 2013/0281187 A1 | 10/2013 | Skelton et al. |

OTHER PUBLICATIONS

PCT Notification of Transmittal of the International Search Report and the Written Opinion of the International Searching Authority, or the Declaration for PCT/US2015/055511, Jan. 26, 2016, 15 pages.

Supplemental European Search Report, PCT/US2013030512, Oct. 9, 2015.

* cited by examiner

WAGERING SYSTEM AND METHOD

CROSS-REFERENCE TO RELATED APPLICATIONS

The present application is a continuation-in-part of U.S. patent application Ser. No. 14/193,996 filed Feb. 28, 2014, which is a continuation of U.S. patent application Ser. No. 13/796,976 filed Mar. 12, 2013, which claims the benefit of the filing date of U.S. Provisional Patent Application No. 61/636,976 filed Apr. 23, 2012, the disclosures of which are hereby incorporated herein by reference.

BACKGROUND

In certain wagering systems, paper vouchers and tickets may be used to place wagers. However, a user may accumulate many pieces of paper for a single wager. For example, a user may receive a paper voucher, a paper ticket, and an additional paper voucher if the wager is successful. The amount of paper may be multiplied if a user conducts multiple wagers.

DETAILED DESCRIPTION

Figure 1:
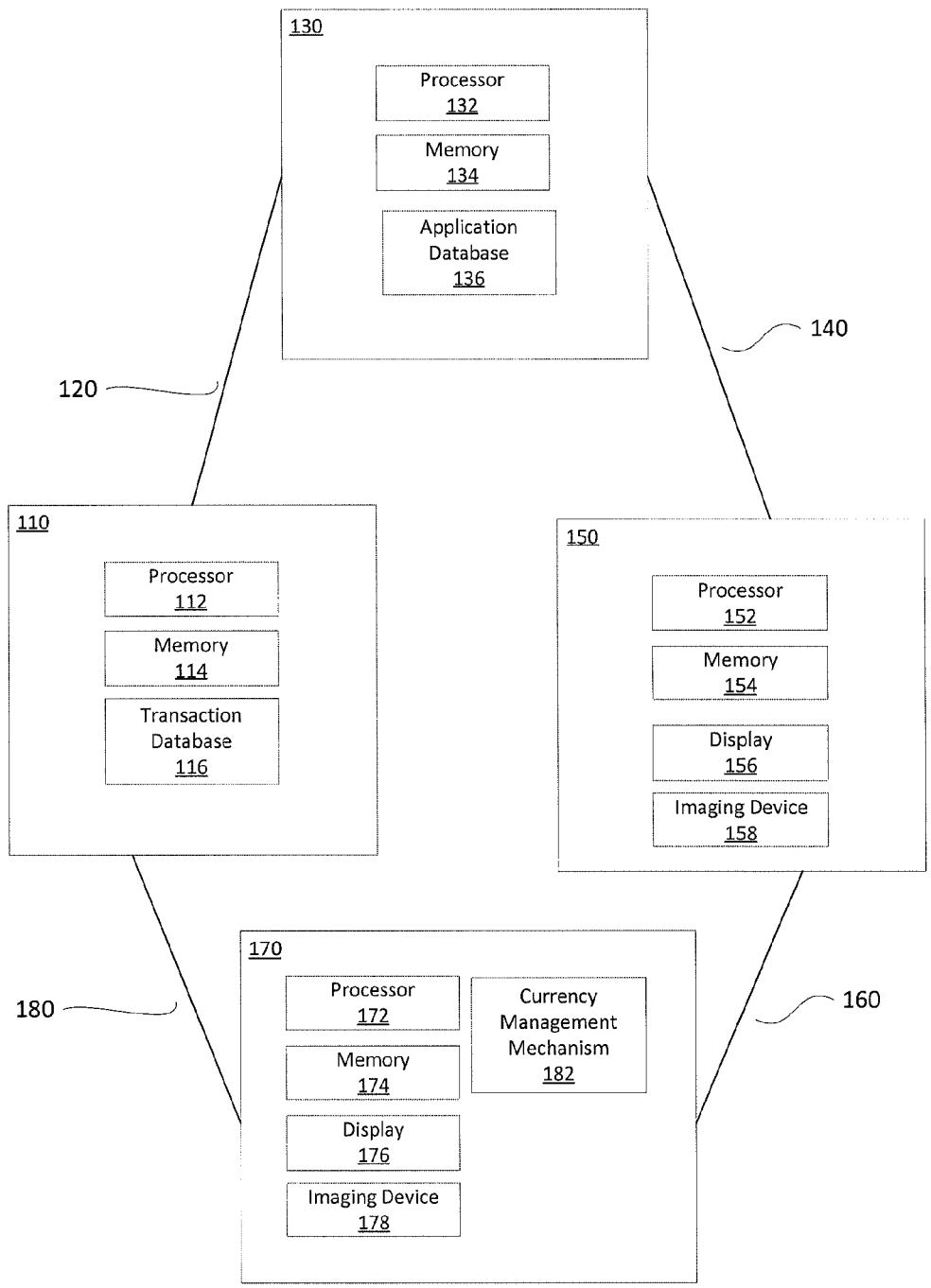
FIG. 1 illustrates an overview of a wagering system according to one aspect of the disclosure.

FIG. 1 illustrates an overview of a wagering system 100 according to one aspect of the disclosure. The system 100 may include a server 110, an application server 130, a client device 150, and a terminal 170.

The server 110, application server 130, client device 150, and terminal 170 may communicate by the links 120, 140, 160, and 180. The links 120-180 may be any type of communication method or channel, such as a wired or wireless connection. For example, a wired communication channel may be Ethernet, Universal Serial Bus ("USB"), or any other such wired communication channels. A wireless communication channel may be Bluetooth, any type of connection in compliance with IEEE 802.11 (e.g., IEEE 802.11a, IEEE 802.11b, etc.), and other such wireless technologies (e.g., any wireless technology operating in the industrial, scientific, and medical ("ISM") radio bands). The links may also include communication according to various protocols, including wide area networks, local area networks, personal area networks, virtual private networks, private networks using communication protocols proprietary to one or more companies, cellular and wireless networks such as 3G, 4G LTE and Wi-Fi networks, and various combinations of the foregoing. The links 120-180 may be over private or public network connections.

The server 110 may store all active wagers and vouchers currently in use in the wagering system 100. The server 110 may be any type of computer, such as a general purpose computer, and may include a processor 112 and memory 114. The memory 114 may store information that may be accessed by the processor 112. The information may include instructions and data that may be executed or otherwise used by the processor 112. The memory 114 may be any type of memory capable of storing information to be accessed by the processor 112. The memory 112 may be a computer-readable medium, or any other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions may be any set of instructions to be executed directly (such as machine code) or indirectly (such as scripts) by the processor 112. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data may be retrieved, stored or modified by processor 112 in accordance with the instructions. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 112 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

The server 110 may also include a transaction database 116. In one example, the transaction database 116 may be stored at the memory 114. In another example, the transaction database 116 may be stored at a separate memory of the server, or may be stored at a separate device apart from the server, such as a remote hard drive. The transaction database 116 may store all information relating to wagering transactions, which will be described in greater detail below.

The application server 130 may receive transaction information from the server 110 and may communicate with the client device 150. The application server may be a general-purpose computer, such as the general-purpose computer described above with respect to server 110. The application server 130 may include a processor 132 and memory 134. The processor 132 and memory 134 may be any type of processor and memory, such as the processor 112 and memory 114 described above. The application server 130 may be communicatively connected to a client device 150 by the link 140. The link 140 may be any type of communication channel, such as the wired and/or wireless communication channels described above.

The application server 130 may also include an application database 136. In one example, the application database 136 may be stored at the memory 134. In another example, the transaction database 136 may be stored at a separate memory of the server, or may be stored at a separate device apart from the server, such as a remote hard drive. In one example, the application database 136 may store the same information as transaction database 116. In another example, the application database may store less than that stored by the transaction database 116, which will be discussed in greater detail below.

According to one implementation, the application server 130 and the server 110 may be a single device.

The client device 150 may receive transaction information from the application server. The client device 150 may be any type of computing device, such as a general-purpose computer or a personal computer. In another example, the client device 150 may be a mobile device, such as a tablet, a mobile phone, or any other type of handheld wired or wireless device. In this way, the mobile device may have additional components and features in addition to the components described above. For example, the mobile device may have a global positioning component and an orientation component to allow the position and direction of the mobile device. The mobile device may have speech recognition components to allow a user to interact by voice. Additionally, the mobile device may be configured to send and/or receive phone calls, text messages, image messages, and e-mails.

The client device may include a processor 152 and memory 154, such as the processor and memory described above. The client device may be communicatively connected to a terminal 170 by the link 160. In addition to the communication methods and protocols describe above, the link 160 may include the terminal 170 scanning machine-readable information displayed on the client device 150, and vice versa, as will be described in greater detail below.

The client device 150 may also include a display 156. The display may be any type of display capable of displaying information to a user of the client device, such as an LCD display. The display 156 may be any size or shape. In one example, the display 156 may be a touchscreen, such as a capacitive or resistive-type display. In another alternative, the display 156 may not include a touchscreen input, and the client device may include a separate input, such as a keyboard.

The client device 150 may also include an imaging device 158. The imaging device 158 may be any type of imaging device, such as a camera. The camera may be any type of camera, such as a CCD- or CMOS-type camera. The imaging device may be capable of taking photographs or reading bar codes, such as linear or 2D bar codes.

The client device 150 may also store applications in the memory 154, such as a wagering application. The wagering application may include a graphic user interface (GUI) that displays information to a user. Such information may include displaying vouchers, tickets, balances, etc. A user may interact with the GUI by a touchscreen or by any other input of the client device.

The client device 150 may be associated with a Unique Identifier (UID). The UID may be any string of characters that is capable of identifying the client device. The characters may be any type of characters, including alphanumeric or non-alphanumeric characters, and may be arranged according to any base, such as decimal, binary, or hexadecimal. For example, the UID may be a manufacturer's serial number provided with each device. In another example, the UID may be any random string of characters. In yet another example, the UID may be a Rewards Number identifying the user. The wagering application may determine the UID associated with the client device 150, or in another example, a user may provide the UID to the wagering application.

The terminal 170 may be any type of computer, such as a general-purpose computer, as is described above. The terminal 170 may include a processor 172 and memory 174, such as the processor and memory described above. The terminal may be communicatively connected to the server by the link 180, as is described above.

The terminal 170 may also include a display 176. The display 176 may be any type of display capable of displaying information to a user of the client device, such as an LCD display. The display 176 may be any size or shape. In one example, the display 176 may be a touchscreen, such as a capacitive or resistive-type display. In another alternative, the display 176 may not include a touchscreen input, and the terminal 170 may include a separate input, such as a keyboard.

The terminal may include an imaging device 178. The imaging device 178 may be any type of imaging device, such as a camera. The camera may be any type of camera, such as a CCD- or CMOS-type camera. The imaging device may be capable of taking photographs or reading bar codes, such as linear or 2D bar codes. According to one implementation, the imaging device 178 may be a bar code reader. The bar code reader may be a stationary bar code reader, or may be a hand-held bar code reader that may be moved or adjusted with respect to the terminal 170.

The terminal 170 may also include a paper payment dispenser mechanism, which may in turn include currency management mechanism 182. The currency management mechanism 182 may include a mechanism to dispense and store one or more types of currency, such as paper or coin. The currency management mechanism 182 may also include a currency receipt mechanism to receive and process currency. The currency management mechanism may also detect an amount of currency deposited or withdrawn by any method, such as visual detection, magnetic detection, or any other detection technique. Additionally, the currency management mechanism may include a card reader to process credit card, debit card, or other card-based transactions. The card reader may also read a Player Rewards Card. The currency management mechanism 182 may conduct transactions according to many protocols or methods, such as by ACH, PayPal, or PINpocket.

The paper payment dispenser mechanism may additionally or alternatively comprise a printer. The printer may print receipts that identify an amount of money to be paid to the holder of the receipt. For instance, the receipt may display a code that can be used to validate the authenticity of the receipt and identify a monetary value. The holder of the receipt may bring the receipt to, by way of example, a teller at a racetrack who, upon validating the receipt's authenticity, gives cash to the user in an amount equal to the monetary value. In some aspects, the receipt may include the same information described below for vouchers. If the terminal includes both a currency management mechanism that is configured to dispense currency and a printer, the terminal may prompt the user to select receiving either cash or a voucher.

The terminal 170 may include a wagering program stored at the memory 174. The wagering program may be a set of instructions that cause the display 176 to display a GUI such that a user may interact with the terminal 170. For example, the GUI may include a user-account interface, a voucher interface, a wagering interface, and a redemption interface. The user-account interface may display information about a user's wagering account, including the amount of funds available in the user's wagering account. The voucher interface may instruct a user to deposit money and may display an amount of money deposited. The wagering interface may display any number of wagering events, possible outcomes, and potential wagers to be made. The redemption interface may allow a user to redeem any wagers. The GUI may also display current balance information. A user may interact with the GUI by an input, such as a touchscreen on the display 176, or any other type of input, such as a keyboard, keypad, arrow buttons, or the like.

The terminal 170 may be a stand-alone kiosk located near a physical location of a wagering event. In another example, the terminal 170 may have any geographic location and may not be limited by a physical location of a wagering event. In another example, the terminal 170 may be a cash register and a bar code scanner, such as those found in a department or convenience store.

Figure 2:
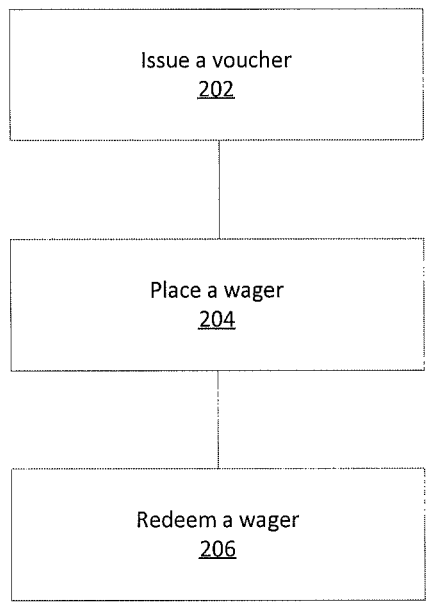
FIG. 2 is a flow chart illustrating a method of wagering according to one aspect of the disclosure.

FIG. 2 is a flow chart illustrating a method 200 of wagering according to one aspect of the disclosure. While the description below refers to a number of blocks of the method 200 in a particular order, it should be understood that the order in which the blocks are performed may be modified, and blocks may be added or omitted.

At block 202, a voucher may be issued. For example, a user may deposit currency and a voucher valued at the amount of currency deposited may be issued. At block 204, a wager may be placed against the value of the voucher, or any other pre-existing balance. At block 206, the wager may be redeemed. For example, if a wager is successful, the ticket may have a value according to the type of wager. This wager may be redeemed for currency or an additional voucher.

Figure 3:
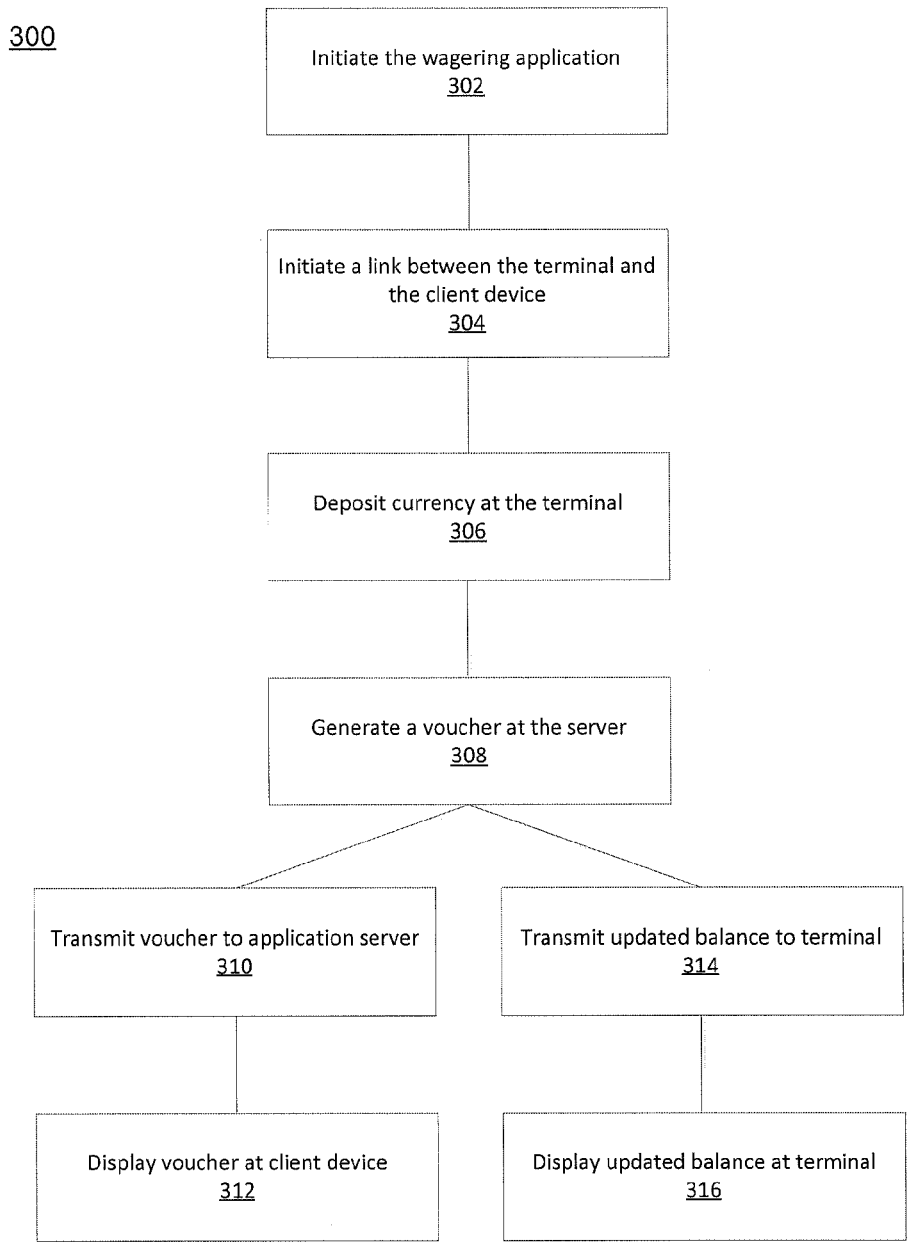
FIG. 3 is a flow chart illustrating a method of issuing a voucher according to one aspect of the disclosure.

FIG. 3 is a flow chart 300 illustrating a method of issuing a voucher according to one aspect of the disclosure. While the description below refers to a number of blocks of the method 300 in a particular order, it should be understood that the order in which the blocks are performed may be modified, and blocks may be added or omitted.

At block 302, a user may initiate the wagering application at a client device, such as the client device 150. The wagering application may determine the UID of the client device 150. In one example, a user may provide the UID to the client device 150. In another example, the wagering application may query the memory 154 of the client device to determine the UID.

The client device 150 may communicate a query regarding the status of the UID to the application server 130. The application server 130 may query the application database 136 to ascertain any information associated with the UID. For example, the application database 136 may store active voucher information, active ticket information, and a voucher balance associated with the UID. The ticket information may include ticket value, ticket price, and the wager outcomes. The application server 130 may transmit such information to the client device 150, where it may be displayed by the wagering application GUI on the display 156.

At block 304, the link 160 may be initiated between the client device 150 and a terminal, such as the terminal 170. At this block, the link 160 between the client device 170 and the terminal 170 may be temporarily initiated in order to transmit the UID associated with the client device 150 to the terminal 170. The link 160 may be established according to any of the communication methods described above. In addition to the methods described above, the imaging device of the terminal 170 may scan a bar code displayed on the display 156 of a client device 150. The bar code may be any type of bar code, such as a linear or two-dimensional bar code, or any other type of machine-readable bar code. In one example, the bar code may be a QR® or Aztec two-dimensional type bar code. The bar code may represent a UID associated with the client device 150.

When the imaging device 176 scans the bar code displayed on the client device 150, the UID associated with the client device 150 may be transmitted to the terminal 170. The terminal 170 may then communicate the UID to the server 110 to query the transaction database 116 as to a current balance associated with the UID. When the UID is transmitted to the server 110, any future transactions may be associated with the UID until the terminal 170 terminates the session associated with the UID. The server 110 may communicate the balance associated with the UID to the terminal 170, and the balance may be displayed at a GUI displayed on the display of the terminal 170. Once displayed at the terminal 170, a user may determine a balance associated with the client device 150.

At block 306, currency may be deposited at the terminal 170. The currency may be deposited using the currency management mechanism 182 described above. Such currency may be any combination of cash or coins. Upon deposit of the currency, the current management mechanism may determine the total value of the currency deposited, and the value of the currency may be displayed at the terminal 170. The terminal 170 may securely store the currency until an authorized terminal operator safely removes excess currency from the terminal. In another implementation, a credit card may be used to deposit funds. The terminal 170 may transmit the value of the added currency to the server 110.

At block 308, a voucher may be generated at the server based on the currency added at the terminal. The voucher may include a value and a transaction identifier (TID), and may be associated with a UID in the transaction database 116. The TID may be any string of characters that is capable of identifying the voucher. The characters may be any type of characters, including alphanumeric or non-alphanumeric characters, and may be arranged according to any base, such as decimal, binary, or hexadecimal. The TID may be generated by the server 110.

The voucher may also be associated with a UID, such as the UID provided at block 302. The server 110 may update the transaction database 116 with an updated balance associated with the UID. For example, if a UID associated with the client device 170 has a zero balance, a deposit of $50 would result in the issuance of a $50 voucher and a new balance of $50 associated with the UID. The transaction will also associate the TID of the voucher with the UID in the transaction database 116.

At block 310, server 110 may communicate the TID and value of the voucher, as well as the UID, to the application server 130. In one implementation, the server 110 may not communicate certain transaction information stored at the transaction database 116, such as transaction time, transaction location, or the like. According to another implementation, the server 110 may transmit all available information to the application server 130. The server 110 may designate the voucher associated with the TID as locked in the transaction database 116 such that it may not be accessed at a separate terminal.

The application server 130 may update the application database 136 based on the voucher value and may communicate the TID and value of the voucher to the client device 150 associated with the UID. Client device 150 associated with the UID may receive the voucher, TID, and value and subsequently display the voucher to a user at block 312. The voucher may then be designated as active once transmitted to the client device 150 such that wagers may be made against the voucher balance by the client device 150 associated with the UID.

At block 314, the server 110 may transmit updated balance information to the terminal 170. The updated balance information may be an updated balance associated with the UID, based on the deposited currency and issued voucher. Once received at the terminal, the terminal may display the updated balance as part of the wagering program GUI at block 316.

With the active voucher, a user may place a wager against the balance of the voucher, as will be described below. Alternatively, a user may log out of one or both of the wagering application or the wagering program. If a user logs out of the wagering program at the terminal 170, the terminal 170 may disconnect the link 180. Any active vouchers may be designated as unlocked at the transaction database 116 such that they may be accessed at a later time.

In another implementation, the link 160 between the client device 150 and the terminal 170 may be initiated by a bar code displayed on the display 176 of the terminal 170. In this way, the display 176 may display a machine-readable code, such as a linear or two-dimensional bar code. In one example, the displayed bar code may represent a TID. In another example, the bar code may identify the particular terminal 170. The imaging device 158 of the client device 150 may scan the bar code and may query the application server 130 regarding the TID as well as the UID associated with the client device 150. The application server 130 may then query the server 110 regarding the TID and the UID. The server 110 may query the transaction database 116 regarding the TID and the UID. The server 110 may then communicate active voucher, active ticket information, and any other information to the terminal 170. The terminal 170 may then display such information by the wagering program GUI via display 176.

Figure 4:
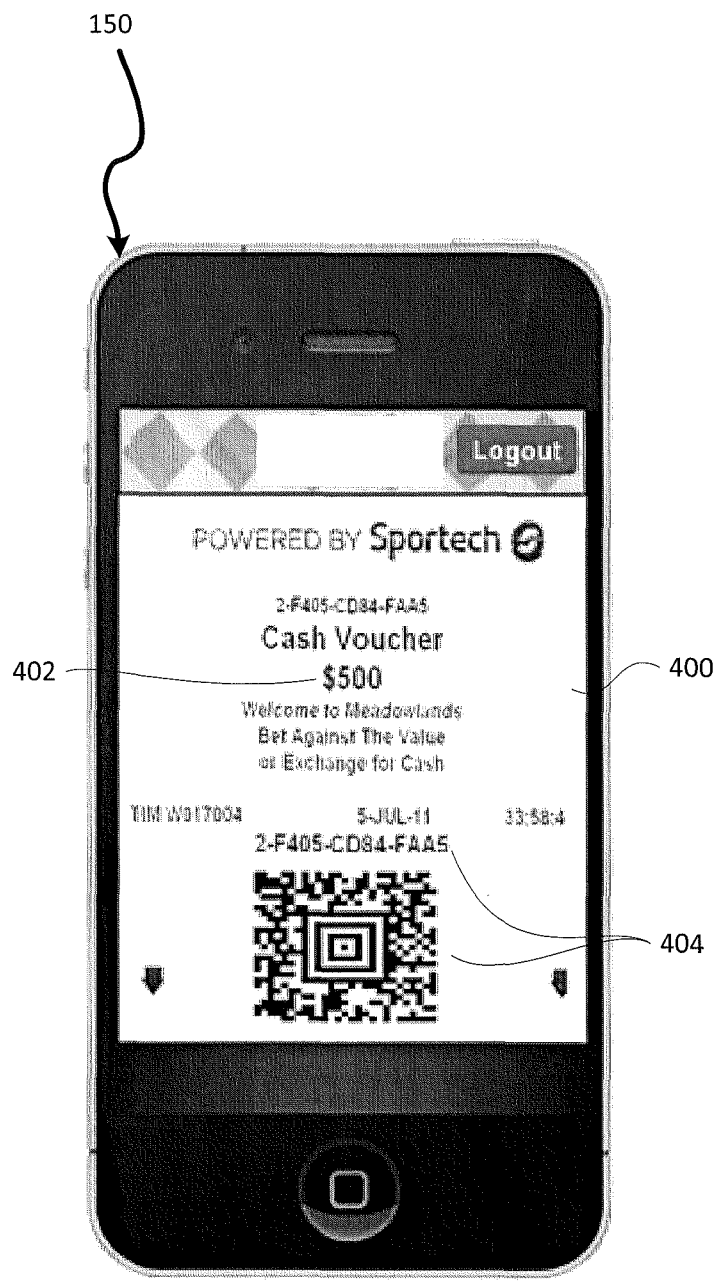
FIG. 4 is illustrates a client device displaying a voucher according to one aspect of the disclosure.

FIG. 4 illustrates a client device 170 displaying a voucher 400 according to one aspect of the disclosure. The voucher 400 may be displayed on the display of a client device 170. As described above, the voucher 400 may include a value 402 and a TID 404, which may be displayed as part of the voucher 400. As shown in FIG. 4, the TID may be represented either as a set of characters, such as the alphanumeric characters shown, or as a bar code, such as the 2D Aztec-style bar code shown. The voucher 400 may be a virtual, digital, or electronic voucher, and may be displayed at the client device 150. The voucher 400 may include additional information, such as time of issue, place of issue, any brand names or logos associated with the issuing entity, advertisements, or any other type of information. The wagering application may also display application navigation buttons, such as a logout button, directional arrows, menu options, or the like.

Figure 5:
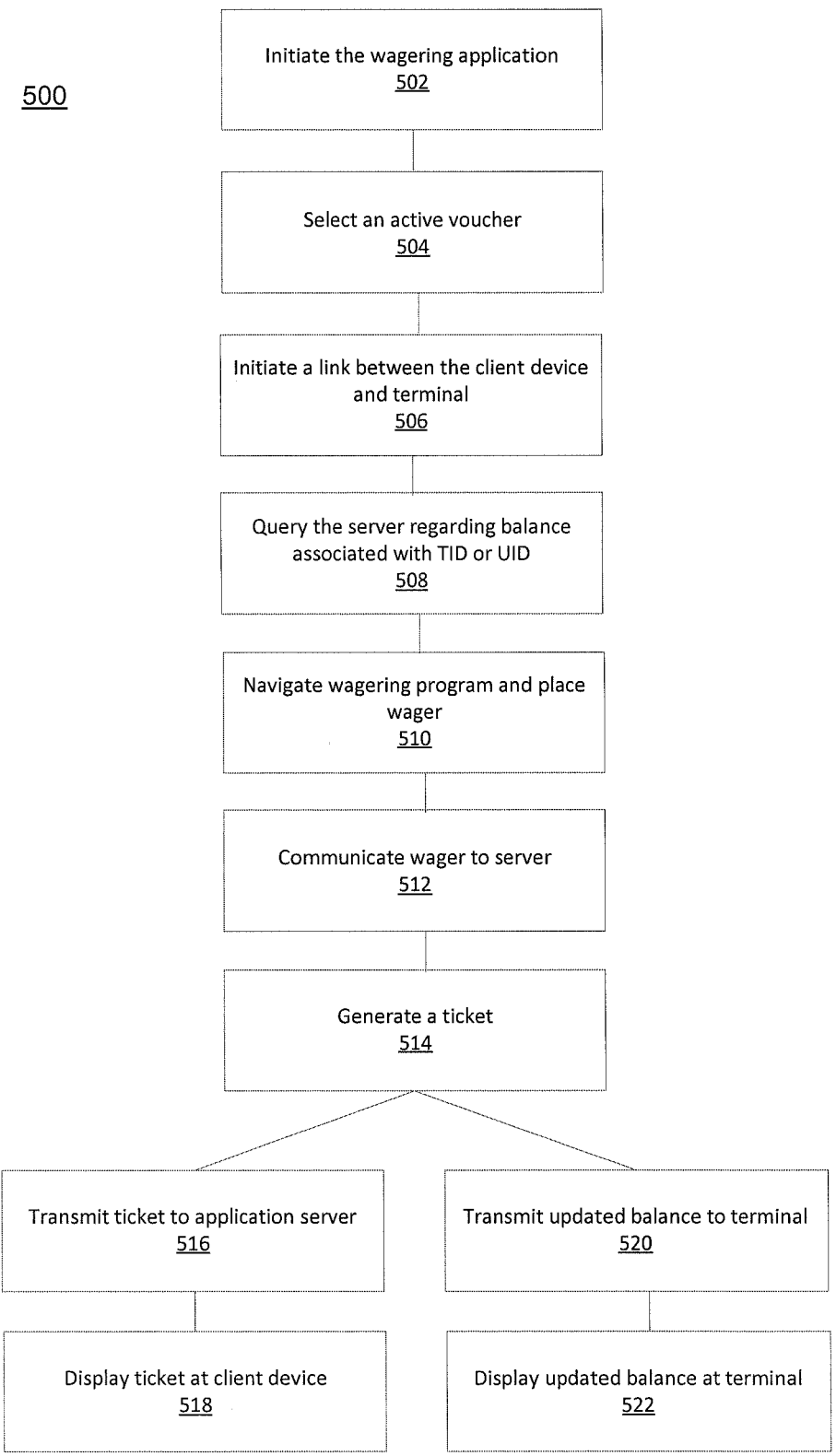
FIG. 5 is a flow chart illustrating a method of placing a wager according to one aspect of the disclosure.

FIG. 5 is a flow chart illustrating a method 500 of placing a wager according to one aspect of the disclosure. While the description below refers to a number of blocks of the method 500 in a particular order, it should be understood that the order in which the blocks are performed may be modified, and blocks may be added or omitted.

At block 502, a user may initiate the wagering application at a client device 150, as described above.

At block 504, a user may select an active voucher. A user may navigate the wagering application GUI displayed on the client device 170. For example, a user may navigate the GUI to display any active vouchers. In some instances, a user may have more than one active voucher. In this example, a user may navigate to determine which voucher to display. Such navigation may be done by swiping a touchscreen, or any other input, such as by keyboard, keypad, arrow buttons, or user voice.

If a user does not have an active voucher, or has an active voucher with a zero balance, the method 300 of issuing a voucher, as described above, may be used to obtain a voucher at the client device 150.

At block 506, a link between the client device and the terminal may be initiated, according to any of the methods described above. For example, the imaging device 178 of the terminal 170 may scan a TID associated with an active voucher that is displayed on the client device 150.

At block 508, the terminal 170 may query the server 110 regarding a balance associated with the UID or TID provided by the client device 170. As described above, the server 110 may query the transaction database 116 to determine a balance associated with the UID, as well as any active vouchers or wagers. The server 110 may communicate an updated balance, as well as any active voucher or wager information, to the terminal 170. The terminal may receive the information from the server 110 and may display the information at a GUI on the display 176 of the terminal 170.

According to one implementation, the method 300 of issuing a voucher may be conducted, and a user may wish to place a wager once an active voucher is displayed on the client device 150. In this regard, a voucher may be displayed at block 312, and the user may proceed to block 510, as described below, without having to duplicate blocks 502-508.

At block 510, a user may navigate the wagering program GUI at the terminal 170 and place a wager. For example, the user may provide an input to the terminal 170, such as by touchscreen, keyboard, etc. The user may select a wagering event. The GUI may display the participants of the wagering event, possible outcomes, and potential wagers to make regarding the wagering event. For example, the wagering event may be a horse race, with the participants being particular horses with unique names. A wager may be placed on a particular horse to win the race. Any other type of wager may be made including, but not limited to, all wagers listed in the ARCI model rules for racing. The price of the wager may be any value, such as a predetermined value, or a value that changes as additional wagers are made.

At block 512, the terminal 170 may communicate wager information to the server 110. Such information may include the wagering event and the particular outcome wagered on, as described above. Such information may also include the terminal location at which the wager was placed, the time of the wager, and any additional information associated with the transaction.

The server 110 may store the wager information at the transaction database 116 and update the transaction database 116 based on the wager information. The terminal 170 may reduce a balance associated with a particular UID based on the price of the wager.

At block 514, the server 110 may generate a ticket and may generate a new voucher based on the updated balance associated with the UID. The ticket may include a TID that may uniquely identify the ticket. The ticket may also include a price, wagering event information, a wagered outcome, and a potential value if the wagered outcome occurs. Instead of generating a new voucher, the system may also credit the user's total balance.

At block 516, the server 110 may communicate ticket information and the updated voucher to the application server 130, where the application server 130 may update an application database 136, and the ticket and voucher may be communicated to and displayed at the client device 150 at block 518.

At block 520, the server 110 may communicate updated balance information to the terminal 170, where it may be displayed on the terminal 170 at block 522.

Figure 6:
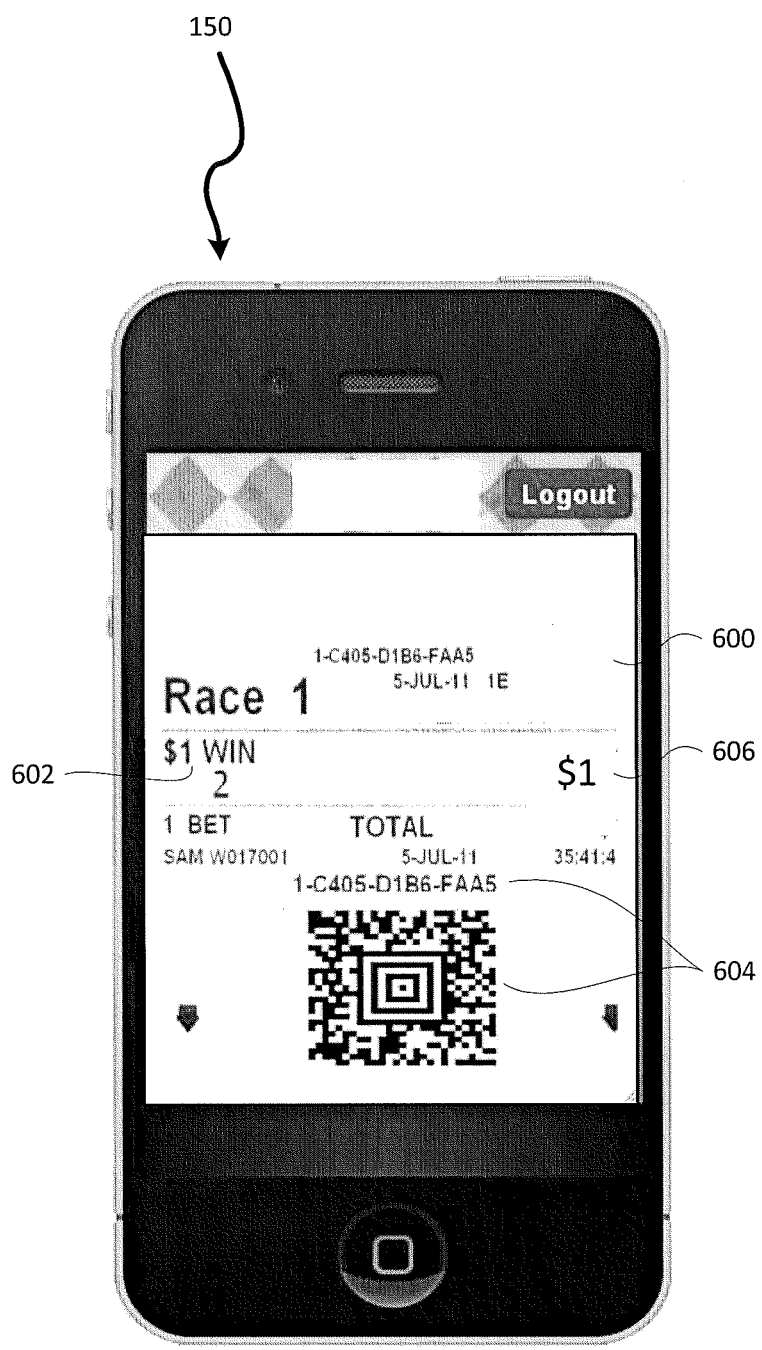
FIG. 6 illustrates a client device displaying a ticket 600 according to one aspect of the disclosure.

FIG. 6 illustrates a client device 150 displaying a ticket 600 according to one aspect of the disclosure. The ticket 600 may include wager 602, a unique TID 604, and a price 606 paid for the ticket 600. The TID may be represented as a machine-readable code, such as a bar code, and/or as a set of characters, such as alphanumeric characters. The ticket 600 may also include additional information, such as wagering venue, wagering event, wagering time, etc.

Figure 7:
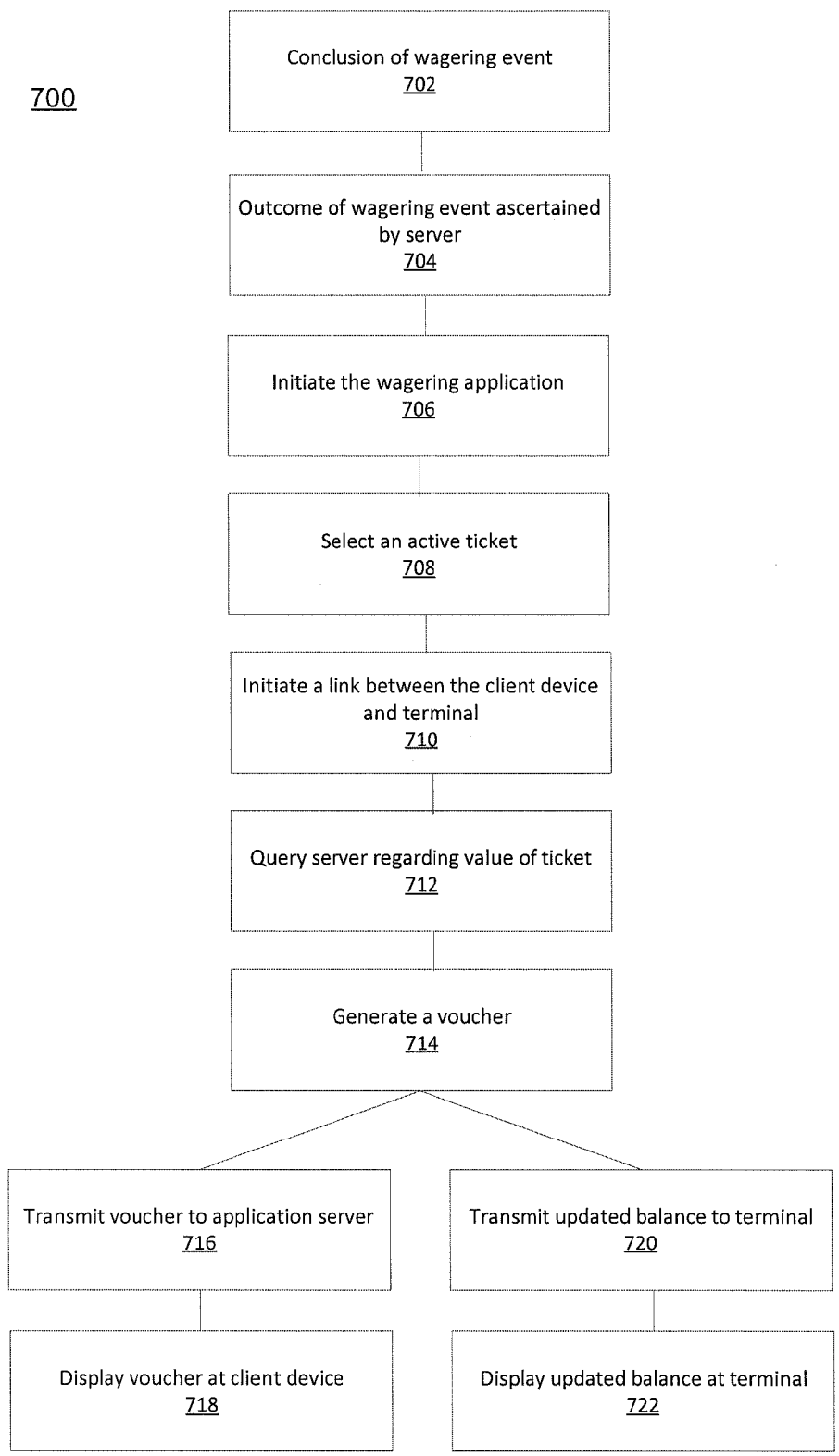
FIG. 7 is a flow chart illustrating a method of redeeming a wager according to one aspect of the disclosure.

FIG. 7 is a flow chart illustrating a method 700 of redeeming a wager according to one aspect of the disclosure.

At block 702, the conclusion of a wagering event may occur. For example, this may be the conclusion of a race, sporting event, or any other type of wagering event. The conclusion of the wagering event may result in an outcome. The outcome of the wagering event may be a particular placement order of participants in the wagering event. For example, a wagering event may be a horse race. At the conclusion of the race, a particular horse may finish in first. The remainder of the participating horses may finish in other places.

At block 704, the outcome of a wagering event may be ascertained by the server 110. For example, the outcome may be communicated to the server 110 and/or application server 130 in an automated fashion. Alternatively, the outcome may be communicated to the server 110 by a wagering administrator. In this way, a wagering administrator may enter details about the outcome of a wagering event by inputting the details into the server 110, either by an input of the server 110, or by another computing device capable of communication with the server 110. The server 110 may update the transaction database 116 to update the value of each active ticket for the wagering event.

At block 706, a user may initiate the wagering application, as described above.

At block 708, a user may select an active ticket. This may be done in the same way as described above in the context of selecting an active voucher.

At block 710, a link between the client device and the terminal may be initiated, according to any of the methods described above. For example, the terminal may scan a TID associated with an active ticket that is displayed on the client device.

At block 712, the terminal may query the server 110 regarding a value of the ticket based on the outcome of the wagering event. The server 110 may retrieve the stored ticket value from the transaction database 116 and communicate the value to the terminal 170. For example, each participant of the wagering event may have a predetermined probability of achieving a particular outcome, e.g., odds. For example, a certain horse may have 7-1 odds of finishing first. If a $1.00 wager is made that the horse will win, that ticket would be worth $8.00. The outcome of the wager may also be displayed on terminal 170.

At block 714, the server 110 may generate a voucher based on the previous value of any vouchers as well as any winning ticket values.

At block 716, the server 110 may transmit the updated voucher information to the application server 130, where it may be stored at the application database 136 and transmitted to the client device 150. The client device may then display the updated voucher at block 718. The user may then place a wager against the voucher value according to the method 500 describe above, or may redeem the voucher for the cash equivalent at the terminal 170 or at a teller window.

At block 720, the server 110 may transmit the updated balance information to the terminal 170, where it may be displayed at the terminal 170 at block 722. As described above, the user may bet against the balance or may redeem the cash value of the balance at the terminal 170 or some other location, such as a teller window.

According to another implementation, the server 110 may ascertain the value of all active tickets associated with the wagering event at the conclusion of the wagering event. In this way, the server 110 may communicate the values of the active tickets and may issue updated vouchers to the application server 130, where the application server 130 may update the transaction database 136 and provide the ticket values and updated vouchers to the client devices 150 associated with the UID for each ticket. In this example, a client device 150 need not initiate the link with the terminal 170 in order to ascertain the value of the ticket and obtain an updated voucher. In this way, a user may initiate a wagering application at the client device 150. The wagering application may communicate with the application server 130 and receive the updated ticket value and updated voucher. When a user displays a ticket associated with a completed wagering event, the ticket may display the value on the face of the ticket, such as shown in FIGS. 8A and 8B.

In one example, a client device may share the ticket and the associated value with others. For example, a user may initiate the client device 150 to take a screenshot of the displayed ticket and/or ticket value, thereby generating an image of the ticket that may be stored on the client device. The image of the ticket may be uploaded to the internet, such as an image hosting website or a social media website, and the image may be displayed according to a user's security preferences. For example, an image hosting website may display the image publicly, while a social media website may only display the image to friends or connections of the user. In another example, a user may share the image by email, text message, Bluetooth, or any file sharing method typically accessible by a client device, e.g., a mobile device.

Figure 8A:
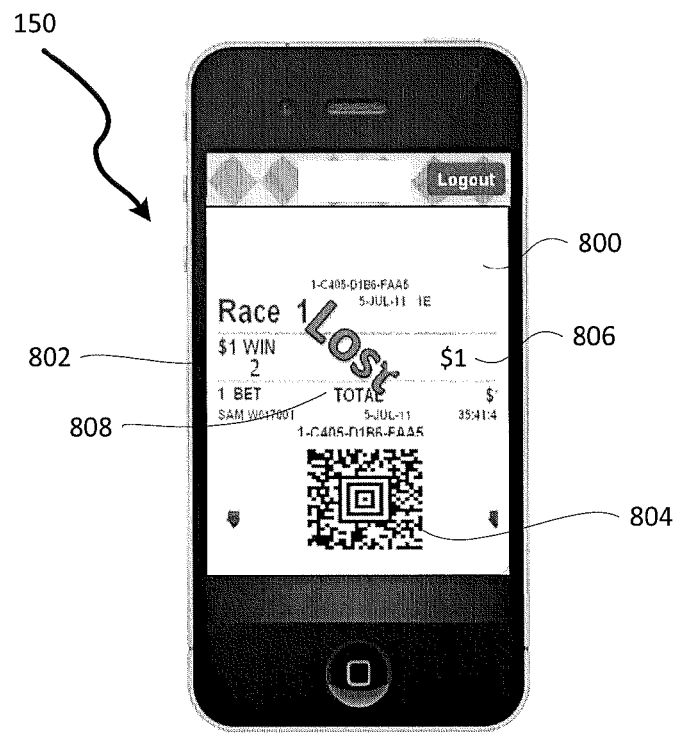
FIGS. 8A and 8B illustrate a client device displaying tickets with the corresponding value according to one aspect of the disclosure.
Figure 8B:
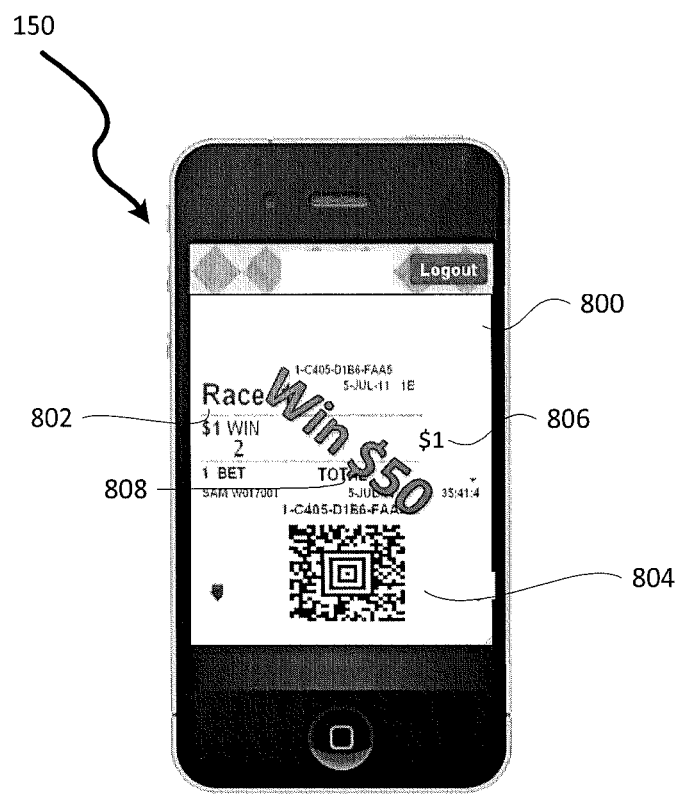

FIGS. 8A and 8B illustrate a client device 150 displaying tickets 800 with the corresponding value according to one aspect of the disclosure. The tickets 800 may include a wager 802, a TID 804, and a price 806 as described above. Additionally, the value 808 of the tickets may be displayed on the ticket, and may be overlaid atop other portions of the ticket. For example, the value 808 may overlay portions of the ticket 800, but may not overlay a machine-readable portion of the TID 804. In the example of FIG. 8A, the wagering outcome did not occur, and therefore the value 808 of the ticket 800 is designated as "Lost," since it has no value. In the example of FIG. 8B, the wagered outcome did occur, and the value 808 of the ticket is displayed as "Win $50."

While the wagering system 100 described above includes vouchers and tickets that may be displayed on a client device 170, the wagering system 100 is compatible with a paper-based wagering system as well. For example, the terminal 170 may include a printing mechanism for printing a physical voucher or ticket and dispensing the voucher or ticket to a user. A player may scan the voucher or ticket at the terminal to either place wagers or to receive an additional voucher for redemption at a teller.

According to another aspect of the disclosure, the UID of the device may be associated with an account stored in the transaction database of the server 110. In this example, a user may opt to store identifying information at the server 110, such as name, address, bank account information, credit card number, player rewards account information, as well as any other demographic information. In this regard, a wagering system may include a server, an application server, and a client device. The function of the terminal may be performed at the client device, for example, by an application stored on the client device. The client device may communicate transaction information directly with the server. For instance, wagers may be placed on the client device and the wager information communicated to server 110. Such information may include the wagering event, the particular outcome wagered on, the UID associated with the user and/or device, the time of the wager, and any additional information associated with the transaction.

In some aspects, the system may determine the user's intention based on information represented by the bar code and then automatically perform the functions intended by the user. By way of example, the system may be able to determine whether the bar code represents an identification of a user or particular device, a voucher or a ticket. For instance, when imaging device 158 detects a bar code, the terminal 170 may extract a string of characters from the code and determine whether the string of characters is intended to represent a UID (e.g., a "U" followed by a number) or a TID (e.g., a "V" for a voucher or "T" for a ticket, in each case followed by a number). The terminal 170 may alternatively transmit the value extracted from the bar code to server 110, the server may look up whether the value is associated with a user, voucher or ticket, and then provide to the terminal the results of, or instructions relating to, the look up.

If terminal 170 determines that the bar code represents a UID, the terminal may use that information to automatically establish a link with the user as described in block 304. In that regard, when the user deposits currency at the terminal as described at block 306, the terminal may determine that the user wants to generate a voucher. Thus, the user may use terminal 170 to generate a voucher without ever touching the touchscreen or keyboard of the terminal.

However, if terminal 170 determines that the bar code represents the TID of a voucher, the terminal may determine that user wants to place a wager and automatically proceed with the wagering process described at blocks 506 et seq. Yet further, if terminal 170 determines that the bar code represents the TID of a ticket, the terminal may determine that the user wants to redeem the ticket and automatically proceed with the redemption process described at blocks 710 et seq.

Additional information may also be included in the bar code to facilitate the performance of a user's intended functions. For instance, a user may use the wagering application GUI and select an option to withdraw less than the entire amount of a voucher. The wagering application may then generate and display a bar code on the client device that includes the TID identifying a voucher and the money to be withdrawn. When the bar code is scanned by terminal 170, the terminal may interpret the presence of a monetary value in the bar code as an intent to withdraw a user-defined amount of money from the voucher identified by the TID. After confirming that the voucher is valid, the terminal may then dispense currency equal to the requested amount and generate a new voucher for the remainder. Alternatively, the bar code may encode a UID and a request to withdraw a specific amount of money and, after confirming that the user's balance is greater than equal to the amount to be withdrawn, dispense the requested amount. Instead of dispensing currency, the terminal may also print a receipt that the user may take to a teller's window to retrieve the requested amount.

The bar code may also include user preferences. For instance, the user may use the wagering application to enter their preferred categories of wagers, which may then be encoded in a bar code and then displayed on the screen of the client device. Upon scanning the bar code and determining that it contains the user's preferences, the terminal may display wagers meeting the user's criteria. For instance, the user's preferences may indicate that they always bet a certain amount of money on their favorite team. Upon scanning that preference and the UID, the terminal may automatically create a ticket at the requested value for the relevant wagering event.

The bar code may further be used to perform a complex set of instructions. For example, the user may use the client device to create a set of instructions to place ten different wagers at essentially the same time. After the user creates the instructions, the device may transmit the instructions to server 110. The server may store the instructions for later use and transmit, back to the client device, a unique identifier associated with the instructions. When the user wishes to perform the instructions, e.g., place the wagers, the client device may create a bar code that contains the unique identifier. When the user is ready to place the wagers, the user may scan the bar code at terminal 170, whereupon the terminal extracts the identifier from the bar code. The terminal may then transmit the identifier to the server 110. Upon receiving the unique identifier and determining that the identifier is associated with a set of instructions, the server 110 may execute the associated instructions, e.g., places the wagers. The server may then transmit a confirmation to the terminal 170 that the instructions were performed, and the terminal 170 may display a confirmation message to the user.

For added security or other purposes, the system may store a range of time within which the instructions to be performed. Using the foregoing example, when server 110 stores the instructions, the server may also store a range of time during which the user can use the bar code to execute the instructions, such as date and time of day of the range's start and end. The server may further associate the instructions with a usage count, where the usage count specifies the number of times that the instructions can be performed based on a bar code scan. When the bar code is scanned and the identifier is transmitted to server 110, the server may check whether the current time falls within the time range associated with the instructions and determine whether the usage count is greater than zero. If so, then the instructions may be performed and the usage count decremented. Otherwise, the server may determine that the instructions should not be executed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system comprising:
an imaging device;
a paper payment dispensing mechanism;

a processor; and
a memory storing instructions executable by the processor;
wherein said instructions comprise:
    obtaining identification information from a bar code that was captured by the imaging device and displayed on a mobile device, the identification information being associated with a wager;
    retrieving, based on the identification information, a wager value that is dependent upon the outcome of the wager;
    obtaining, from the bar code, a payment request value entered by a user on the mobile device;
    determining whether the value entered by the user is less than the wager value; and
    dispensing a payment from the paper payment dispensing mechanism equal to the payment request value entered by the user when the value entered by the user is less than the wager value.

2. The system of claim 1 wherein the paper payment dispensing mechanism dispenses paper currency.

3. The system of claim 1 wherein the paper payment dispensing mechanism dispenses a payment voucher.

4. The system of claim 1 further comprising obtaining, from the bar code, an indication that the user has requested to withdraw the payment request value entered by the user.

5. The system of claim 1 further comprising a server in communication with the processor, and wherein the instructions further comprise transmitting the identification information to the server and receiving the wager value in response.

6. The system of claim 1 further comprising a display, and wherein the instructions further comprise displaying the amount of the wager value and the payment request value entered by the user.

7. The system of claim 1 wherein the system is a stand-alone kiosk.

8. A system comprising:
an imaging device;
a processor; and
a memory storing instructions executable by the processor;
wherein said instructions comprise:
    capturing, with the imaging device, bar code information displayed on a mobile device;
    extracting bar code information from the bar code;
    determining whether the bar code information represents an identification of a user or a wager;
    determining the identification of a user from the bar code information when the bar code information represents an identification of a user; and
    determining a wager price and a wager event from the bar code information when the bar code information represents a wager.

9. The system of claim 8 further comprising determining whether the bar code information represents a voucher, and determining an amount of money from the bar code information when the bar code information represents a voucher.

10. The system of claim 9 further comprising a currency management mechanism configured to dispense cash and wherein the instructions further comprise instructing the currency management mechanism to dispense cash based on the amount of money.

11. The system of claim 8 further comprising a currency management mechanism configured to receive cash deposits, and wherein the instructions further comprise associating an amount of deposited cash with the user associated with the identification of a user when the bar code information represents an identification of a user and cash has been deposited into the currency management mechanism.

12. The system of claim 11 further comprising a printer, and wherein the instructions further comprise instructing the printer to print a voucher based on the amount of deposited cash.

13. The system of claim 8 wherein the system further comprises a display, and wherein the instructions further comprise determining whether the bar code information represents user-selected criteria for wagers, determining whether any wagers satisfy the user-selected criteria when the bar code information represents user-selected criteria for wagers, and displaying wagers that satisfy the user-selected criteria.

14. A system comprising:
an imaging device;
a processor; and
a memory storing instructions executable by the processor;
wherein said instructions comprise:
    capturing, with the imaging device, bar code information displayed on a mobile device;
    identifying, within the bar code information, a plurality of wagers;
    identifying a usage value associated with the plurality of wagers, where the usage value is associated with the number of times that the wagers have been placed; and
    placing the wagers based on the usage value.

15. The system of claim 14 wherein: the processor comprises at least two processors; the system comprises a server containing one of the two processors in network communication with a kiosk containing another of the two processors; the kiosk contains the imaging device; and the plurality of wagers are stored at the server.

16. The system of claim 14 wherein the wagers are stored in association with a unique identifier and the bar code information encodes the unique identifier.

17. The system of claim 14 wherein the instructions further comprise identifying a range of time associated with the plurality of wagers, and wherein placing the wagers further comprises placing the wagers when the then-current time is within the range of time.

18. The system of claim 14 wherein the usage value is changed by one each time the wagers have been placed.

19. The system of claim 14 wherein the system further comprises a display, and wherein the display displays a confirmation to the user after the wagers are placed.

\* \* \* \* \*